May 10, 1966   R. W. VOCKROTH, JR   3,250,285
LOGIC NETWORK FOR NUMERICALLY-CONTROLLED MACHINE TOOLS
Filed Feb. 12, 1963                2 Sheets-Sheet 1

INVENTOR.
RICHARD W. VOCKROTH JR.
BY
Clarence R. Patty, J.
ATTORNEY

INVENTOR.
RICHARD W. VOCKROTH JR.
BY
ATTORNEY

United States Patent Office 3,250,285
Patented May 10, 1966

3,250,285
LOGIC NETWORK FOR NUMERICALLY-CONTROLLED MACHINE TOOLS
Richard W. Vockroth, Jr., Painted Post, N.Y., assignor to Corning Glass Works, Corning, N.Y., a corporation of New York
Filed Feb. 12, 1963, Ser. No. 257,942
17 Claims. (Cl. 137—81.5)

This invention relates to an improved logic network for controlling the relative positioning between an operating tool and a workpiece or its supporting table, and more particularly to a fluid-operated logic network for determining magnitude and direction of table, workpiece, and/or tool position error with respect to a desired positionment on numerically-controlled machine tools, and for actuating mechanism to correct such error.

Presently most numerically-controlled machine tools are operated by a command signal from an input device (usually a punched paper tape read) which is fed into an electronic device where it is interpreted as a unique position of the table or cutting tool with respect to one axis. This is registered as a series of digits in binary-coded-decimal form representing a distance from an arbitrary "zero" location. An arithmetical operation is then performed within the electronic circuitry to determine the direction and magnitude of position error. An output signal then causes a motor to drive the table or tool to reduce the error. As the table moves, electronic pulses from the table count down the error digits. When the error reaches a certain critical figure, ordinarily around .100 inch, the table speed drops from a high speed known as a "rapid traverse" or "slew rate" to a low speed, referred to as "tracking." The table continues to move at this slow speed until the error is counted down to zero and then stops.

With my new system, which includes the improved network of this invention, the arithmetical and count-down operations are eliminated. In place of these rather involved and tedious time-consuming operations, my invention utilizes a series or plurality of comparisons between a variable signal representing the actual table or tool position and a predetermined command signal representing a desired position. The results of such comparison are then utilized to actuate means for correcting or eliminating any error or difference between the actual position and the desired position. This type of operation offers a distinct advantage in fluid systems such as pneumatic or hydraulic in which the indivdual network components have relatively lower speeds of response than their electronic counterparts. The overall efficiency of fluid systems, however, is comparable to that of the electronic systems since the actual speed capability of either system is determined by the inertia of the mechanisms responding to control signals. This mechanical response time is much greater than the response time of either a fluid or electronic system, therefore the high-speed capability of electronic systems is not actually utilized.

It thus has been an object of my invention to provide an improved logic network for determining and controlling the relative positioning between a workpiece or its supporting structure and an associated operating tool in numerically-controlled machine tools.

A further object of my invention has been to provide an improved logic network which eliminates the arithmetical and count-down operations necessary with previously known types of networks.

An additional object of my invention has been to provide a unique network for comparing a signal representing the actual position of a table or tool with a signal representing a desired position to determine the magnitude and direction of position error and actuate suitable means to eliminate such error.

A still further object of my invention has been to provide an improved fluid-operable logic network for controlling the relative positioning between a workpiece or its supporting structure and an operable tool in numerically-controlled machine tools.

These and other objects of my invention will become more apparent to those skilled in the art from the following specification and accompanying drawings in which.

Although the invention is illustrated with regard to the positionment of a machine table for holding a workpiece, it may equally well be utilized to control the positionment of the tool performing the work. In addition, since the network is applicable to any point to point numerically controlled machine, it may be utilized to control the positionment between virtually any workpiece or its supporting structure and a tool for operating on such workpiece.

Figure 1:
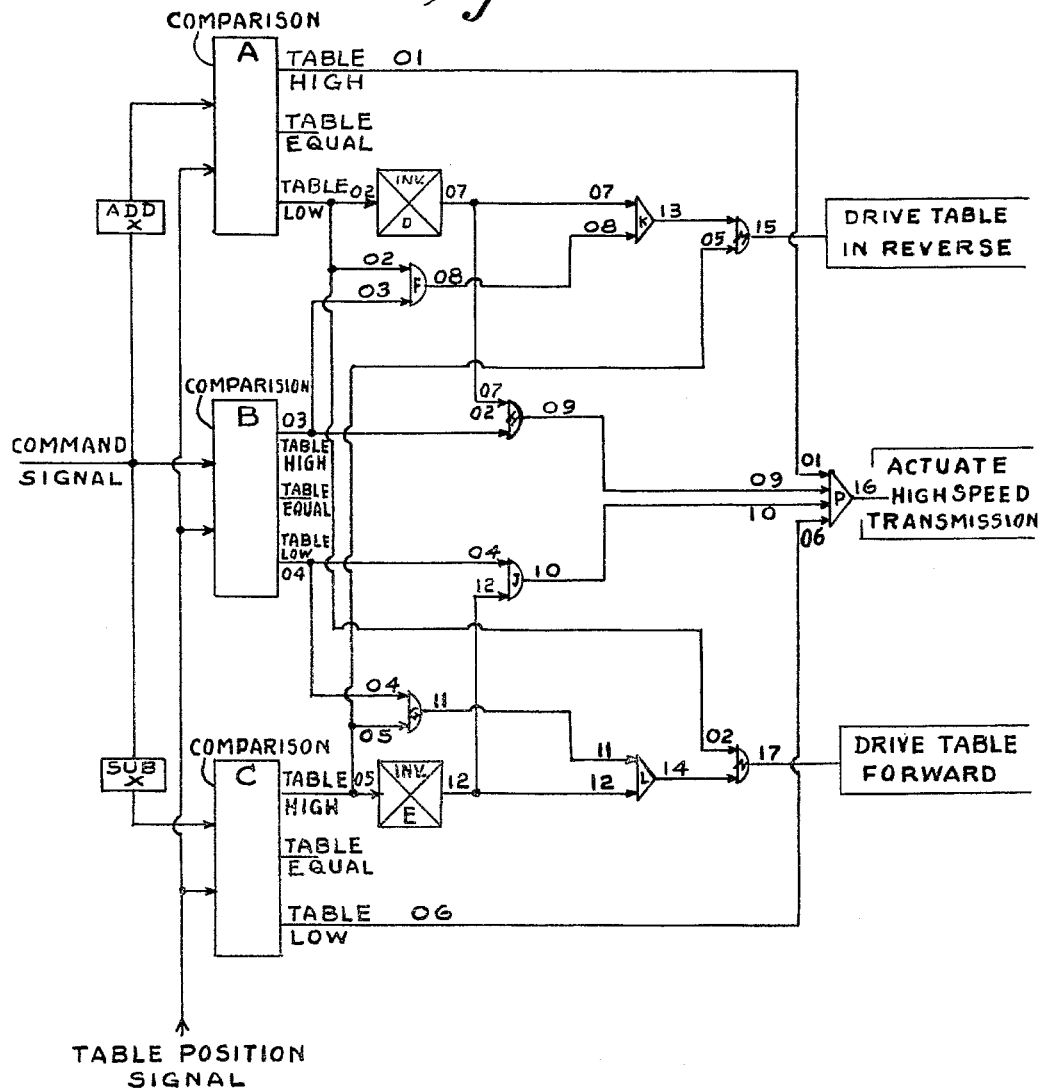
FIGURE 1 is a schematic illustration of a logic network embodying my invention.

FIGURE 1 illustrates a logic network by which the proper speed and direction of table movement may be determined after a comparison has been made between command digits representing a desired positionment of the table, and digits representing the actual table position with respect to an arbitrary "zero." The critical distance below which the table must travel at a low or tracking speed may be indicated by a value $x$. For the purpose of illustration, the value of $x$ may be considered to be .100 inch, and the resolution of the command and table positioning system may be considered to be .001 inch.

A plurality of comparison matrices A, B, C are supplied with both a predetermined command signal representing the desired positionment of the table or tool, and a variable signal representing the actual positionment thereof. The portion of the command signal supplied to the comparison matrix A is modified by the addition of value $x$, whereas the portion of the command signal supplied to comparison matrix C is modified by the subtraction of value $x$. Comparison matrices A and C consist of comparator elements equal in value to multiples of $x$, but not fractional parts thereof. Comparison matrix B consists of comparator elements equal in value to fractional parts of $x$ only, with the smallest value being equal to the resolution of the system. In this example, the B matrix would make comparisons in the hundredths and thousandths digit positions only. As an illustration, a command signal of 12.348 would appear in matrix A as 12.4, in matrix C as 12.2, and in matrix B as .048.

In general, comparison matrices A and C determine table position errors of large magnitude, when high speed table drive is required, while comparison matrix B determines small errors where a tracking speed is utilized. If matrix A indicates that the table position is higher than the command position augmented by the the value $x$, then the error has to be greater than the value of $x$.

Conventional logic symbols, including inverters D, and E, AND gates F, G, H, J, M, N, and OR gates K, L, and P, with connecting lines 01 through 17 running therebetween, are used in FIGURE 1 to indicate functional components of the system. Although the network could be considered as a fluid system and described on a "pressurized flow no flow" basis, for the sake of simplicity the system shown in FIGURE 1 may be treated as a conventional electronic module, operating with positive and negative voltages. Accordingly, an inverter is a device whose output is exactly opposite in polarity to its input;

a positive input is changed within the device to a negative output and vice versa. An AND gate is a device whose output will be positive when, and only when, all of its inputs are positive; otherwise, its output is negative. An OR gate is a device whose output will be positive whenever any one of its inputs is positive, and if no positive input is present, the output is negative.

The system, as shown in FIGURE 1, is therefore said to operate under "positive" logic; that is, functions are performed by the presence of positive voltages. A positive voltage on line 15, 16, or 17 of FIGURE 1 initiates one or more of the functions described at the end of such line or lines. Although either the tool or the supporting table upon which a workpiece is placed may be controlled in accordance with this invention, since it is the relative positionment therebetween which is important, the embodiment described herein relates to the control of the positionment of the work table.

As shown in FIGURE 1, the table will move at a low or tracking speed, unless a positive voltage is present on line 16. The table is considered to move in the forward direction to reach a position represented by a higher number, that is, when the command signal is calling for a higher number than that representing the actual table position; whereas the table will move in a reverse direction to reach a position represented by a lower number.

When considering only the outputs from matrices A and C it can be shown mathematically that there are nine distinct output configurations possible, since each is capable of indicating that the table position is high, equal, or low as compared to the command signal. However, four of these are logically impossible. For example, if the output of comparison matrix A indicates that the location of the table is higher than the command plus $x$, then obviously the output of comparison matrix C must show that the table is also higher than the command minus $x$. Therefore, matrix C cannot have an output of "table equal" or "table low," while the output of matrix A is "table high." Similarly, comparison matrix A cannot have an output of "table equal" or "table high" while the matrix C is "table low."

The following specific examples illustrate the operation of the network shown in FIGURE 1. In each example it will be assumed that a predetermined command signal, representing a desired table position, is applied to the network and compared with a signal representing the actual position of the table.

*Example 1*

Comparison matrix A and comparison matrix C indicate "table high."

This means that the table is beyond, or higher than the location called for by the command signal, and that the distance is greater than the amount $x$. Accordingly, as shown in the following explanation, the network must cause the table to be driven at high speed in the reverse direction.

Since both comparison matrices A and C indicate "table high" positive voltages are present on lines 01 and 05, and negative voltages on lines 02 and 06. Line 01, being an input to OR gate P, drives line 16 positive to actuate the high speed mechanism. This, in its simplest form, may be a gear shift arrangement actuated by a solenoid. The positive voltage on line 05 is applied to inverter E, AND gate G, and AND gate M. Of these three, only AND gate M is significant in this instance, since the output from inverter E is negative, and the negative polarity at line 02, applied to AND gate N, nullifies the effect of the output from G. The negative voltage on line 02 is applied to inverter D, AND gate F, and AND gate N. Line 17, therefore, cannot be positive, regardless of the polarity of line 14, so the table cannot be driven forward; that is, toward a higher location.

The output line 07 of inverter D is positive, since its input line 02 is negative. This positive voltage is applied to AND gate H (redundantly, since line 16 is positive regardless of the polarity of line 09), and to OR gate K. Line 13 is therefore driven positive and, since line 05 is also positive, AND gate M is actuated and output line 15 becomes positive, which actuates the mechanism to cause the table to be driven in the reverse direction.

In the exact opposite case where comparison matrices A and C both indicate "table low," positive voltages are present on lines 02 and 06, and negative voltages on lines 01 and 05. This indicates that the actual table position is low with respect to the command position by a distance greater than the amount $x$, and the network calls for a high speed drive in the forward direction.

*Example 2*

Comparison matrix A indicates equality; comparison matrix C indicates "table high."

This means that the actual position of the table is beyond, or higher than, the location called for by the command signal fed into the network, and that the magnitude of the position error may or may not be greater than the amount $x$, depending on the output of the comparison matrix B. To illustrate, assume that the value of $x$ is .100 and that the resolution of the system is .001. If the command is 2.199 and the table is actually at 2.200, then comparison matrix A will indicate equality (table at 2.2=command of 2.1+.100), and comparison matrix C will indicate table high (table at 2.2 is greater than command of 2.1−.100). In such a case, the network would require the table to move in a reverse direction at low speed.

If, however, the command were 2.100 and the table were at 2.299, the outputs of matrices A and C would be the same as before. However, the table would be in error by a distance greater than .100, or the distance $x$. The network would accordingly require that the table move in the reverse direction, as before, but at high speed. Whenever comparison matrix A indicates equality, the table must move in the reverse direction, and if matrix B indicates "table high" the movement must be at high speed.

Referring again to FIGURE 1, with the input to comparison matrix A comparing equal, lines 01 and 02 are both negative. Output line 07 from inverter D is positive making line 13 also positive, since K is an OR gate. Further, since the comparison made in matrix C indicates that the table is high, line 05 is positive, which together with line 13 activates AND gate M to cause line 15 to become positive and actuate mechanism to drive the table in reverse. It should be noted that since line 02 is negative, it precludes the generation of a positive output from AND gate N.

The positive output of inverter D provides one of the two required inputs to AND gate H. Therefore, if the output of comparison matrix B indicates that the table is high, line 03 will be positive, which, in conjunction with line 07 actuates AND gate H to drive line 09 positive, and accordingly line 16 becomes positive since P is an OR gate, resulting in high speed drive.

*Example 3*

Comparison matrix A indicates that the table is low; comparison matrix C indicates equality.

This means that the location called for by the command signal is beyond or higher than the actual table position, and that the magnitude of position error may or may not be greater than the amount $x$ depending on the output of comparison matrix B. This condition is actually the reverse of that described in Example 2 above. In such a situation, line 02, being positive, provides one of the required inputs to AND gate N. Further, since comparison matrix C indicates equality, line 05 is negative, and accordingly output line 12 from inverter E is positive. Since gate L is an OR gate, line 14 is driven positive, which together with line 02, actuates AND gate N, so that line 17 becomes positive to actuate the mechanism for driving the table in the forward direction. Since line 05 is negative, it precludes the generation of a positive output from AND gate M.

As can be seen from the drawing, line 12 also serves one of the required inputs to AND gate J. Therefore, if comparison matrix B indicates "table low", line 04 will be positive, which together with line 12 actuates the AND gate J to drive line 10, and accordingly line 16 positive, and the table drive will be at high speed.

*Example 4*

Comparison matrix A indicates table low; comparison C indicates table high.

This means that the table position error, if any, is less than the value of the amount $x$. Any movement of the table must be at low speed and at a direction determined by comparison matrix B.

Referring again to FIGURE 1, under such circumstances lines 01 and 06 are negative, whereas lines 02 and 05 are positive. Output lines 07 and 12 from inverters D and E, respectively, are negative since the inputs to these inverters are positive, and this precludes a positive output on line 09 from AND gate H or on line 10 from AND gate J. Thus, all four inputs to OR gate P are negative, and the table cannot be driven at high speed.

Since comparison matrix C indicates the table is high, line 05 is of course positive and provides one of the required inputs to AND gates M and G. Also since comparison matrix A indicates that the table is low, line 02 is positive and provides one required input to AND gates N and F. If comparison matrix B indicates "table high", then line 03 is positive and the second input to AND gate F is provided, resulting in lines 08, 13, and 15 becoming positive to drive the table in the reverse direction. Similarly, if comparison matrix B indicates "table low", line 04 will be positive providing the second input into AND gate G, resulting in lines 11, 14, and 17 becoming positive to drive the table in a forward direction.

Figure 2:
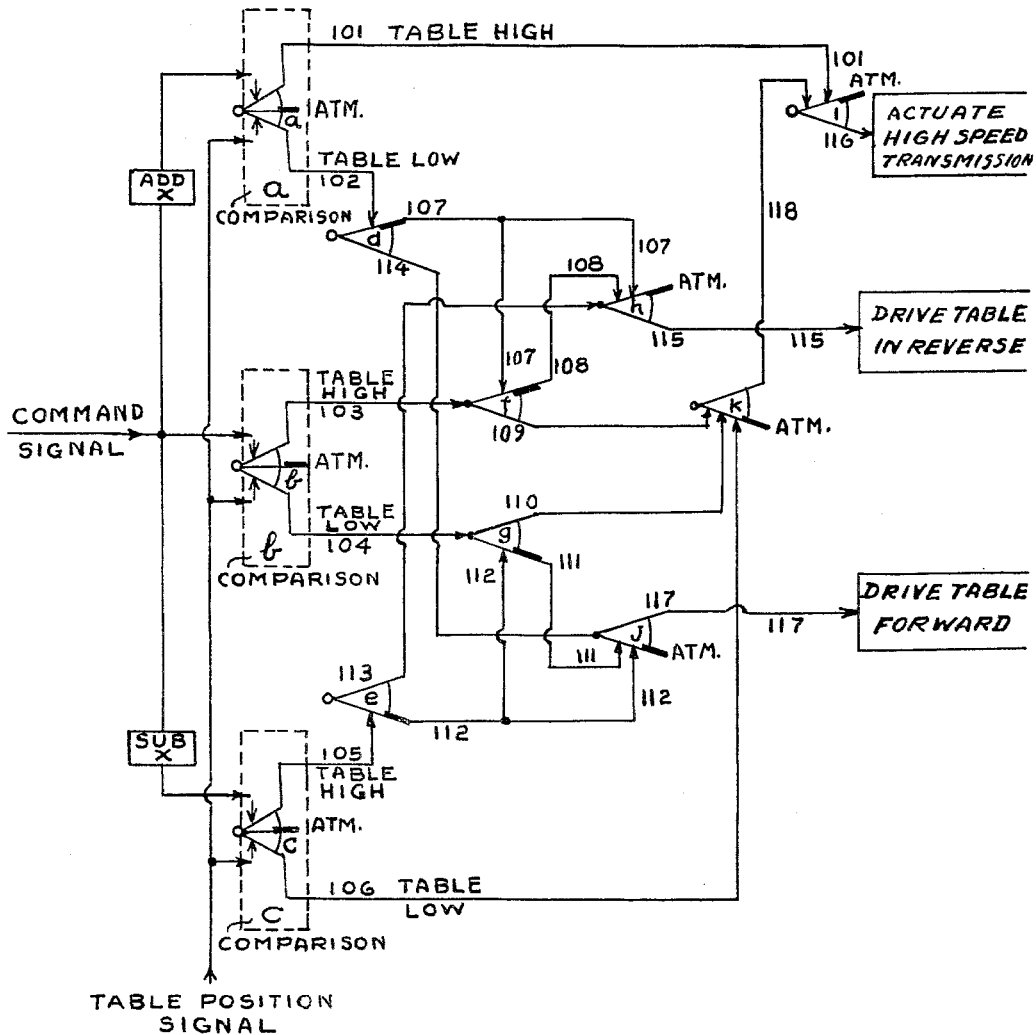
FIGURE 2 is a schematic illustration of a fluid logic network similar to that shown in FIGURE 1, but illustrating the utilization of fluid components, i.e. fluid amplifiers.

Referring now to FIGURE 2, a second embodiment of the network is shown which is essentially the same as the network shown in FIGURE 1, with the exception that fluid amplifiers are illustrated as the logic components. Basically two types of fluid amplifiers are shown in the network of FIGURE 2, however, the logic network is not restricted to these particular types.

A plurality of comparison matrices $a$, $b$, and $c$, which may consist of a plurality of center-stable tri-legged fluid amplifiers such as disclosed in the Frank E. Murphy, Jr., application Serial No. 226,298, filed September 26, 1962, now Patent No. 3,181,545, are supplied with a predetermined command signal representing the desired table position and a variable signal representing the actual table position. As in the network of FIGURE 1, the command signal supplied to comparator $a$ has an increment $x$ added thereto; whereas the command signal supplied to comparator $c$ has an increment $x$ subtracted therefrom. A plurality of fluid amplifiers $d$, $e$, $f$, $g$, $h$, $j$, $k$, and $l$ are interconnected between comparators $a$, $b$, $c$, and themselves by means of lines 101 through 118.

Figure 2A:
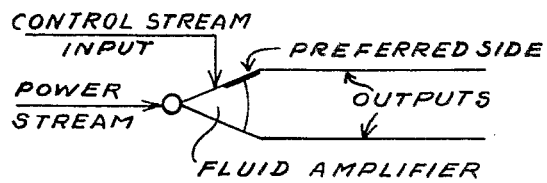
FIGURE 2A is a schematic illustration of one type of fluid amplifier which may be utilized in the network of FIGURE 2.

As shown in FIGURE 2A, the fluid amplifiers have power streams applied at their bases, one or more control stream inputs entering the sides of the amplifiers for deflecting the power streams, and a preferred side output. The "preferred side", or "normal side" as it is sometimes called, refers to the amplifier output which is normally pressurized when a power stream input is present and no control stream is present to deflect it. The preferred side is designated in the drawings by a heavy black line.

Fluid amplifiers $d$, $e$, $k$, and $l$ are continuously supplied with a power stream by a suitable source of pneumatic power, such as an air compressor. All other power streams, as shown, are supplied by preceding or upstream amplifiers in series. Amplifiers $d$ and $e$ may be considered inverters since output lines 107 and 112 are positive or pressurized when control inputs 102 and 105 from comparators $a$ and $c$ respectively, are negative or unpressurized and vice versa. Amplifiers $k$ and $l$ are OR gates, in that if any one of the control inputs to each of such amplifiers is present, the power stream is deflected within the amplifier. Amplifiers $h$ and $j$ serve as combination AND and OR gates, since in order to have a deflected output it is necessary to have a power stream *and* one *or* the other of the control inputs present. All of the fluid amplifiers output lines labeled "ATM." are vented directly to the atmosphere. Lines 115, 116, and 117, when pressurized, initiate the functions described at the end thereof.

The following specific examples illustrate the operation of the fluid amplifier network shown in FIGURE 2.

*Example 5*

Comparison matrices $a$ and $c$ both indicate that the table is high.

This means that the variable signal representing the actual table position is high with respect to the command signal and accordingly lines 101 and 105 are pressurized. Line 101, being a control input to amplifier $l$, deflects the power stream of such amplifier to pressurize line 116 which actuates the high speed table drive. Line 105, from matrix $c$, deflects the power stream of fluid amplifier $e$, thus pressurizing line 113. The flow through line 113 provides a power stream for fluid amplifier $h$. Since line 102 is not pressurized, there is no power stream deflection within the fluid amplifier $d$, and its power stream continues to flow out the preferred side output and pressurizes line 107. Accordingly, fluid amplifier $h$ is provided with a power input from line 113 which is deflected by a control input from line 107. The power output from fluid amplifier $h$, therefore, pressurizes line 115 which actuates mechanism to drive the table in reverse, that is toward a lower position. It should be noted that since the power stream from amplifier $d$ flows into line 107 and not line 114, there is no power stream for fluid amplifier $j$, which of course precludes the actuation of a forward table drive, and accordingly the output of comparison matrix $b$ is immaterial.

*Example 6*

Fluid comparison matrix $a$ indicates equality; whereas comparison matrix $c$ indicates that the table is high.

Of the comparison matrices' outputs, only line 105 is pressurized since the power stream of comparator $a$ is vented to the atmosphere when the signals supplied thereto are equal. Pressurized line 105 acts as a control input to fluid amplifier $e$ and deflects the power stream thereof outwardly through line 113. Line 113 furnishes a power stream for fluid amplifier $h$. Since the power stream of amplifier $d$ is undeflected, it flows outwardly through its preferred side and pressurizes line 107, which is a control input to fluid amplifier $h$ and amplifier $f$. The power stream supplied to amplifier $h$ by pressurized line 113 is deflected by pressurized line 107 from its preferred side to line 115, which actuates mechanism for driving the table in reverse direction. Here again, it should be noted that, as in Example 5, there is no power stream supplied to fluid amplifier $j$ so that there can be no signal calling for a forward drive of the table.

If comparison matrix $b$ indicated that the table was high with respect to the command signal, line 103 would be pressurized and both the power stream and a control input would be present at fluid amplifier $f$. This would cause the power stream of fluid amplifier $f$ to be deflected outwardly through line 109. Line 109 functions as a control input to fluid amplifier $k$ and would deflect the power stream thereof outwardly through line 118. Line 118 functions as a control input to fluid amplifier $l$ and would deflect the power stream pressurizing line 116 to actuate the high speed transmission mechanism.

Example 7

Fluid comparator *a* indicates that the table is low; whereas comparator *c* indicates equality.

Of the comparison matrices' outputs, only line 102 is pressurized since the compare-equal signal of comparator *c* is vented to the atmosphere. Pressurized line 102 functions on a control input to fluid amplifier *d* and deflects the power stream thereof to pressurize line 114 which furnishes a power stream to fluid amplifier *j*. Since line 105 is not pressurized, the power stream of fluid amplifier *e* continues to flow to its preferred side output, thus pressurizing line 112 which functions as a control input to amplifier *j*. Accordingly, amplifier *j* has both a power stream and a control input supplied thereto, so that line 117 is pressurized to actuate the forward drive mechanism for the table.

Since line 112 is pressurized, it not only supplies a control input to fluid amplifier *j*, but also functions as a control input for amplifier *g*. Therefore, if comparison matrix *b* indicates that the table is low as compared with the command signal, line 104 which functions as a power stream for fluid amplifier *g* will be pressurized. Accordingly, the power stream of fluid amplifier *g* will be deflected to pressurize output line 110. Since line 110 functions as a control input to fluid amplifier *k* it will deflect the power stream and pressurize line 118. Further, since line 118 functions as a control input for fluid amplifier *l*, it will deflect the power stream of such amplifier to pressurize line 116 and accordingly actuate the high speed transmission.

Example 8

Fluid comparison matrix *a* indicates "table low"; whereas comparison matrix *c* indicates "table high."

Lines 102 and 105 are accordingly pressurized by comparison matrices *a* and *c* respectively. Line 102, being a control input to fluid amplifier *d*, deflects the power stream of amplifier *d* to pressurize line 114 and provide a power stream to fluid amplifier *j*. Line 105, on the other hand, being a control input to fluid amplifier *e*, deflects the power stream of amplifier *e* pressurizing line 113 and providing a power stream to fluid amplifier *h*. Lines 107 and 112 are therefore not pressurized, and in the event that a power stream should be presented to either fluid amplifier *f* or *g*, the power stream will flow to the preferred side output 108 or 111, respectively.

If comparison matrix *b* finds the table high, line 103 will be pressurized and provide a power stream to fluid amplifier *f*. The power stream, being undeflected (since line 107 is not pressurized) will flow to the preferred side of amplifier *f* and provide a control input via pressurized line 108 to fluid amplifier *h*. The deflected power stream of amplifier *h* will then pressurize line 115 to actuate the mechanism to drive the table in a reverse direction. Similarly, if comparison matrix *b* finds the table low, line 104 will be pressurized and provide a power stream to fluid amplifier *g*. Since there is no control input to deflect the power stream, it will pressurize line 111 which will deflect the power stream of fluid amplifier *j* to pressurize line 117 and activate the mechanism to drive the table in a forward direction.

Since, as previously stated, lines 107 and 112 are not pressurized, lines 109 and 110 cannot be pressurized. Further since line 106 is not pressurized, because comparison matrix *c* indicates a high condition, the power stream of fluid amplifier *k* must flow to its preferred side output and is vented to the atmosphere. Also, since line 101 is not pressurized, no control input is present at fluid amplifier *l* and its power stream must flow to its preferred side output and accordingly high speed transmission cannot be actuated.

Although I have disclosed the now preferred embodiments of my invention it will be readily apparent to those skilled in the art that various changes and modifications may be made thereto without departing from the spirit and scope of the invention as defined in the appended claims.

I claim:

1. A logic network for numerically-controlled machine tools which comprises; a first comparison means for comparing a command signal representing a desired positionment augmented by the addition of a constant with a signal representing an actual positionment, a second comparison means for comparing the command signal modified by the subtraction of the constant with the actual positionment signal, and a third comparison means for comparing the command signal with the actual positionment signal; means responsive to the output of said second comparison means, the output of said first comparison means when the augmented command signal compares higher than the actual positionment signal, and the output of said third comparison means when the command signal compares higher than the actual positionment signal to actuate means for increasing the actual positionment signal; and means responsive to the output of said first comparison means, the output of said second comparison means when the modified command signal compares lower than the actual positionment signal, and the output of said third comparison means when the command signal compares lower than the actual positionment signal to actuate means for decreasing the actual positionment signal.

2. A logic network as defined in claim 1 which comprises, means including an OR gate responsive to certain outputs of said comparsion means when the compared actual positionment signal is different from the command signal by an amount greater than the constant, for rapidly reducing the difference between such signals.

3. A logic network for determining magnitude and direction of positionment error between a desired position and an actual position in numerically-controlled machine tools which comprises, a command signal representing a desired positionment applied to such network, means for adding a constant to said command signal, means for subtracting a constant from said command signal, first comparison means for comparing said command signal having the constant added thereto with a signal representing the actual positionment, second comparison means for comparing said command signal having the constant subtracted therefrom with said actual positionment signal, third comparison means for comparing said command signal with said actual positionment signal; said first, second, and third comparison means being operable simultaneously; sensing means responsive to the output of said second comparison means and the outputs of said first and third comparison means when the actual positionment signal compares low for actuating mechanism to increase the actual positionment, and accordingly the actual positionment signal, to reduce the difference between the compared signals; and further sensing means responsive to the output of said first comparison means and the outputs of said second and third comparison means when the actual positionment signal compares high for actuating mechanism to decrease the actual positionment, and accordingly the actual positionment signal, to reduce the difference between the compared signals.

4. A logic network as defined in claim 3 wherein the sensing means include an AND gate, and an inverter means in series with said AND gate for providing a positive output signal to such AND gate in response to an opposite input signal.

5. A logic network as defined in claim 3 including means responsive to the output of said first, second, and third comparison means when the compared difference between said actual positionment signal and the command signal is greater than the constant, for actuating high speed transmission mechanism to rapidly reduce the difference between the command signal and the actual positionment signal.

6. A logic network as defined in claim 5 wherein said last mentioned means includes an OR gate actuated in response to the output of said first comparison means when the actual positionment signal as determined by such first comparison means compares high, and in response to the output of said second comparison means when the actual positionment signal as determined by such second comparison means compares low, thereby actuating the high speed transmission mechanism to rapidly decrease the magnitude of difference between the command and actual positionment signals.

7. A logic network for determining magnitude and direction of positionment error in numerically-controlled machine tools which comprises, comparison means including a third comparison means for comparing a command signal representing a desired positionment with a signal representing the actual positionment, a first comparison means for comparing the command signal modified by the addition of a constant with the actual positionment signal, and a second comparison means for comparing the command signal modified by the subtraction of such constant with the actual positionment signal; each of said comparison means having a "high" output which is actuated when the actual positionment signal is higher than the signal with which it is compared, and a "low" output which is actuated when the actual positionment signal is lower than the signal with which it is compared; a first OR gate and a first AND gate connected in series with the "low" output of said first comparison means, a first inverter means connected in series between said "low" output and said first OR gate to supply a positive signal to said first OR gate and accordingly said first AND gate when said "low" output is not positively actuated; and the "high" output of said second comparison matrix connected to said first AND gate to, in conjunction with a positive signal from said first OR gate, actuate said first AND gate when said "high" output is positively actuated, and thereby activate mechanism for reducing the actual positionment signal; second inverter means connected in series with a second OR gate and a second AND gate between said second OR gate and the "high" output of said second comparison matrix, said second AND gate connected to the "low" output of said first comparison matrix, and said second inverter means, second OR gate, and second AND gate, all operable similarly to said first inverter means, first OR gate and first AND gate respectively, to actuate mechanism for increasing the actual positionment signal when the "low" output of said first comparison matrix is positively actuated and the "high" output of said second comparison matrix is not positively actuated.

8. A logic network as defined in claim 7 including a third AND gate connected in series between the "high" output of said third comparison matrix and said first OR gate and in parallel with said first inverter between the "low" output of said first comparison matrix and said first OR gate, for actuating said first OR gate when a positive signal is present at both said last mentioned "high" and "low" outputs; and a fourth AND gate connected in series between the "low" output of said third comparison matrix and said second OR gate, and in parallel with said second inverter between the "high" output of said second comparison matrix and said second OR gate, for actuating said second OR gate when a positive signal is present at both of the last mentioned "high" and "low" outputs.

9. A logic network as defined in claim 7 including a third OR gate connected to the "high" output of said first comparison matrix and the "low" output of said second comparison matrix actuated by a positive signal from either of said outputs to activate high speed mechanism for rapidly reducing the difference between the command signal and the actual positionment signal.

10. A logic network as defined in claim 9 including a fifth AND gate positioned in series between the "high" output of said third comparison matrix and said third OR gate and in series between said first inverter and said third OR gate to actuate said third OR gate when a positive signal is present at the "high" output of said third comparison matrix and a positive signal is supplied by said first inverter and thereby activate the high speed mechanism; and a sixth AND gate positioned in series between the "low" output of said third comparison matrix and said third OR gate and in series between said second inverter and said third OR gate to actuate said third OR gate when a positive signal is present at the "low" output of said third comparison matrix and a positive signal is supplied by said second inverter and thereby activate the high speed mechanism.

11. A logic network for determining magnitude and direction of positionment error in numerically-controlled machine tools which comprises, fluid comparison means including a third comparison matrix of fluid amplifiers for comparing a command signal representing a desired positionment with a signal representing the actual positionment, a first comparison matrix of fluid amplifiers for comparing the command signal modified by the addition of a constant with the actual positionment signal, and a second comparison matrix of fluid amplifiers for comparing the command signal modified by the subtraction of such constant with the actual positionment signal; each of said comparison matrices having a "high" output which is positively pressurized when the actual positionment signal is higher than the signal with which it is compared, and a "low" output which is positively pressurized when the actual positionment signal is lower than the signal with which it is compared; a first pair of fluid amplifiers each having a continuous power stream supplied thereto and a preferred output side; one of said first pair of fluid amplifiers having a control input supplied by an unbalanced output of said first comparison matrix and the other of said fluid amplifiers having a control input supplied by an opposite unbalanced output of said second comparison matrix; a second pair of fluid amplifiers each having a preferred output side vented to the atmosphere; one of said second pair of fluid amplifiers having a control input supplied by the pressurized preferred output side of one of said first pair of fluid amplifiers, and a power stream supplied by the deflected output of the other of said first pair of fluid amplifiers; the other of said second pair of fluid amplifiers having a control input supplied by the pressurized preferred output side of the other of said first pair of fluid amplifiers, and a power stream supplied by the deflected output of the one of said first pair of fluid amplifiers; the deflected output of one of said second pair of fluid amplifiers being operable to actuate means to reduce the difference between the command signal and the actual positionment signal when the actual positionment signal varies in one direction from the command signal, and the deflected output of the other of said second pair of fluid amplifiers being operable to actuate means for reducing the difference between the command signal and the actual positionment signal when the actual positionment signal varies in an opposite direction from the command signal; and said first pair and second pair of fluid amplifiers being cooperable with each other in response to the outputs from said fluid comparison means to energize the correct means to reduce the difference between the command signal and the actual positionment signal.

12. A logic network as defined in claim 11 wherein the unbalanced output of said first and second comparison matrices which are not connected to said first pair of fluid amplifiers communicate with control inputs of an OR gate fluid amplifier having a power stream continuously supplied thereto and a preferred side output vented to the atmosphere, and output means responsive to the deflection of the power stream by the pressurization of either of said control inputs for actuating high-speed transmission means to rapidly decrease the difference between the command signal and the actual positionment signal.

13. A logic network for determining magnitude and direction of positionment error in numerically-controlled machine tools which comprises; fluid comparison means including a first comparison matrix for comparing a command signal augmented by the addition of a constant with an actual positionment signal, a second comparison matrix for comparing the command signal modified by the suppression of such constant with the actual positionment signal, and a third comparison matrix for comparing the command signal representing a desired positionment with the actual positionment signal representing the actual positionment at the time of comparison; each of said comparison matrices having a "high" output which is pressurized when the actual positionment signal is higher than the signal with which it is compared, and a "low" output which is pressurized when the actual positionment signal is lower than the signal with which it is compared; a first fluid amplifier having a power stream continuously supplied thereto, a preferred side output, and a control input supplied by the "low" output of said first comparison matrix when such output is pressurized; a second fluid amplifier having a power stream continuously supplied thereto, a preferred side output and a control input supplied by the "high" output of said second comparison matrix when such output is pressurized; a third fluid amplifier having a preferred side vented to the atmosphere, a control input supplied by the preferred side output of said first fluid amplifier when its power stream is undeflected, and a power stream supplied by the output of said second fluid amplifier when its power stream is deflected by a control input stream; a fourth fluid amplifier having a preferred side output vented to the atmosphere, a control input supplied by the preferred side output of said second fluid amplifier when its power stream is undeflected, and a power stream supplied by the output of said first fluid amplifier when its power stream is deflected by a control input stream; the output of said third fluid amplifier, when its power stream is deflected, actuating means to decrease the actual positionment signal and reduce the difference between the actual positionment signal and the command signal; and the output of said fourth fluid amplifier, when its power stream is deflected by a control input, actuating means to increase the actual positionment signal and reduce the difference between the actual positionment signal and the command signal.

14. A logic network as defined in claim 13 including an OR gate fluid amplifier having a power stream continuously supplied thereto, a preferred output vented to the atmosphere and a plurality of control stream inputs; one of said control stream inputs being supplied by the "high" output of said first comparison matrix when such output is pressurized, and another of said control stream inputs being actuated by the "low" output of said second comparison matrix when such output is pressurized; and output means extending from said OR gate fluid amplifier responsive when either of said control inputs is pressurized for actuating high speed transmission mechanism to rapidly decrease the difference between the command signal and the actual positionment signal.

15. A logic network as defined in claim 13 including a fifth fluid amplifier having a preferred side output, a control stream input supplied by the preferred side output of said first fluid amplifier when its power stream is undeflected, and a power stream supplied by the "high" output of said third comparison matrix when such output is pressurized; a sixth fluid amplifier having a preferred side output, a control stream input supplied by the preferred side output of said second fluid amplifier when its power stream is undeflected, and a power stream supplied by the "low" output of said third comparison matrix when such output is pressurized; the preferred side output of said fifth fluid amplifier supplying a control input to said third fluid amplifier to deflect its power stream and actuate the mechanism for decreasing the actual positionment signal when the "low" output of said first comparison matrix is pressurized, the "high" output of said second comparison matrix is pressurized and the "high" output of said third comparison matrix is pressurized; and the preferred side output of said sixth fluid amplifier supplying a control input to said fourth fluid amplifier to deflect its power stream and actuate the mechanism for increasing the actual positionment signal when the "low" output of said first comparison matrix is pressurized, the "high" output of said second matrix is pressurized, and the "low" output of said third comparison matrix is pressurized.

16. A logic network as defined in claim 15 including an OR gate fluid amplifier having a power stream continuously supplied thereto, a preferred side output vented to the atmosphere and a plurality of control stream inputs; the deflected power stream of both said fifth and sixth fluid amplifiers supplying a control input stream to said OR gate fluid amplifier, and output extending from said OR gate means actuated when a control stream input is present at either of said inputs to deflect its power stream for activating high speed mechanism to rapidly reduce the difference between the command signal and the actual positionment signal.

17. A logic network of the type responsive to a command signal and a variable signal for controlling a mechanism which reduces the difference between the command signal and the variable signal comprising,
   (a) means for modifying said command signal,
   (b) first comparison means responsive to said variable signal and said modified command signal for detecting differences between the two signals which are of a greater magnitude than the differences between the modified command signal and the command signal,
   (c) second comparison means responsive to said variable signal and said command signal for detecting differences between the two signals which are of a lesser magnitude than the differences between the modified command signal and the command signal, and
   (d) means responsive to the first and second comparison means for actuating a high speed transmission mechanism to rapidly reduce the difference between the variable signal and the command signal when the compared difference therebetween is greater than the difference between the modified command signal and the command signal.

References Cited by the Examiner
UNITED STATES PATENTS

| | | | |
|---|---|---|---|
| 2,817,775 | 12/1957 | Rosenberg et al. | 307—106 |
| 2,909,717 | 10/1959 | Hulls et al. | 318—28 |
| 2,968,144 | 1/1961 | Royle et al. | 60—6 |
| 3,066,285 | 11/1962 | McCoy | 340—347 |
| 3,069,608 | 12/1962 | Forrester et al. | 318—162 |
| 3,086,199 | 4/1963 | Shimizu et al. | 340—347 |
| 3,101,436 | 8/1963 | Younkin | 318—162 |
| 3,107,850 | 10/1963 | Warren et al. | 137—81.5 |

M. CARY NELSON, *Primary Examiner.*

LAVERNE D. GEIGER, *Examiner.*

S. SCOTT, *Assistant Examiner.*